United States Patent [19]

Olszewski et al.

[11] 4,362,819
[45] Dec. 7, 1982

[54] MOLDABLE FLUOROALUMINOPHOSPHATE GLASSES

[75] Inventors: Anthony R. Olszewski, Bath; Paul A. Tick, Corning, both of N.Y.; Leon M. Sanford, deceased, late of Campbell, N.Y., by Michele R. Sanford, administratrix

[73] Assignee: Corning Glass Works, Corning, N.Y.

[21] Appl. No.: 327,915

[22] Filed: Dec. 7, 1981

Related U.S. Application Data

[63] Continuation-in-part of Ser. No. 248,002, Mar. 26, 1981, abandoned, which is a continuation-in-part of Ser. No. 124,924, Feb. 26, 1980, abandoned.

[51] Int. Cl.$^3$ .......................... C03C 3/16; C03C 3/18
[52] U.S. Cl. ........................... 501/44; 65/134; 65/66; 501/30; 501/902; 501/903
[58] Field of Search ............... 501/44, 45, 902, 903, 501/30

[56] References Cited

U.S. PATENT DOCUMENTS

| | | | |
|---|---|---|---|
| 2,481,700 | 9/1949 | Sun et al. | 501/44 |
| 2,511,226 | 6/1950 | Sun et al. | 501/44 |
| 2,511,227 | 6/1959 | Sun et al. | 501/44 |
| 3,281,254 | 10/1966 | Weidel | 501/44 |
| 4,225,459 | 9/1980 | Faulstich | 501/44 X |
| 4,239,645 | 12/1980 | Izumitani et al. | 501/44 X |
| 4,285,730 | 8/1981 | Sanford et al. | 501/44 |

FOREIGN PATENT DOCUMENTS

| | | | |
|---|---|---|---|
| 19342 | 11/1980 | European Pat. Off. | 501/44 |
| WO80/01274 | 6/1980 | PCT Int'l Appl. | 65/66 |

OTHER PUBLICATIONS

Laser Program Annual Report-1975-Lawrence Livermore Laboratory pub. Mar. 1976, pp. 197-202.
Leidtorp, R. A. "Vitrification and Crystallization Capacity of BaPO$_3$F-AlF$_3$ (GaF$_3$)-(Li, Na, K, Zn, Cd, Pb)F$_x$Glasses" Izv. Akad. Nauk. SSSR, Neorg. Mater. 1972, 8(11) pp. 2053-2054.

*Primary Examiner*—Helen M. McCarthy
*Attorney, Agent, or Firm*—Clinton S. Janes, Jr.

[57] ABSTRACT

The present invention is directed to the production of essentially dry alkali metal ($R^1$) aluminofluorophosphate glasses optionally containing at least one divalent metal ($R^2$) which exhibits a transition temperature below about 350° C., good chemical durability, resistance to weathering, and glass stability, and which demonstrate the capability of being molded at temperatures below 400° C. into complex shapes. The alkali metal aluminofluorophosphate glasses consist essentially, as analyzed on an atomic basis, between about $R^1AlP_2F_2O_6$ and $R^1{}_{3.75}AlP_3F_4O_9$ with the requirement that the components comply with the following atomic ratios:

F:Al >2 but <4 (preferred 3±0.5)
P:Al >2 but <3
$R^1$:P >0.5 but <1.24 (preferred >0.75 but <1.1)

Those values, expressed in terms of weight percent as analyzed on the oxide basis, convert to the following approximate ranges:

$R^1{}_2O$ 13-38
$Al_2O_3$ 16-23
$P_2O_5$ 46-64
F 17-23.

8 Claims, 1 Drawing Figure

SCHEMATIC BEHAVIOR OF ALKALI METAL-ALKALINE EARTH METAL-ALUMINOPHOSPHATE GLASSES

A - Isoproperty Contour Line
B - Not Durable Enough
C - Too Stiff
D - Molding Range
E - Decreasing $T_g$
F - Increasing Durability

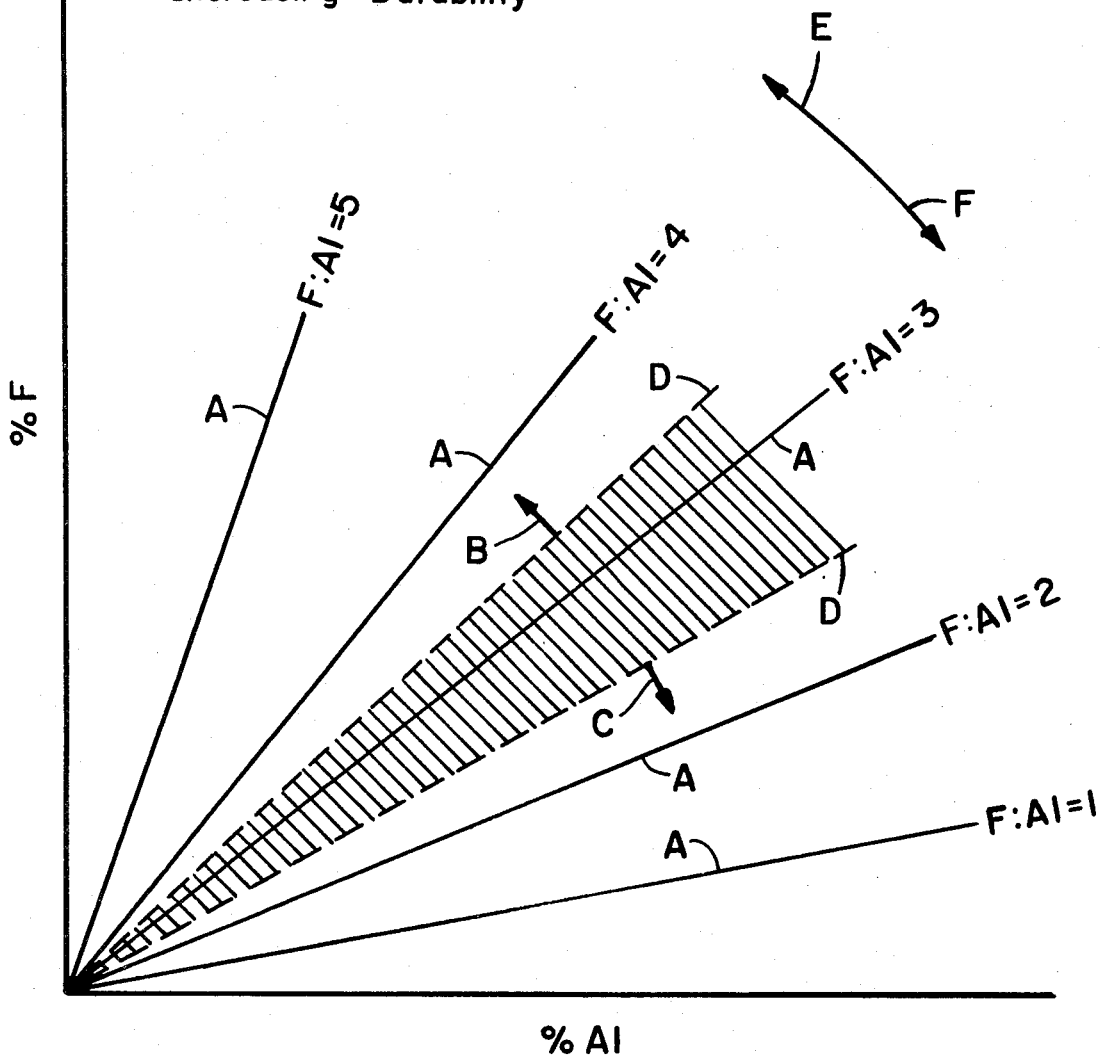

MOLDABLE FLUOROALUMINOPHOSPHATE GLASSES

This application is a Continuation-In-Part of application Ser. No. 248,002, filed Mar. 26, 1981, which was a Continuation-In-Part of application Ser. No. 124,924, filed Feb. 26, 1980, and both now abandoned.

BACKGROUND OF THE INVENTION

United States Application Ser. No. 82,150, now U.S. Pat. No. 3,285,730, filed Oct. 5, 1979 in the names of L. M. Sanford and P. A. Tick, discloses a group of glasses having compositions within the alkali metal oxide-alkaline earth metal oxide-fluoride-phosphate field ($R_2O$-$RO$-$F$-$P_2O_5$) displaying low transition temperatures ($T_g$) and the capability for molding and otherwise shaping glass bodies under pressure at low temperatures, viz., below 450° C., without the need for hydration. Those glasses have base compositions consisting essentially, expressed in mole percent on the oxide basis as calculated from the batch, of about 15–45% $R_2O$, consisting of 0–45% $Li_2O$, 0–20% $Na_2O$, and 0–10% $K_2O$, 0–20% $RO$, consisting of 0–10% $MgO$, 0–15% $CaO$, 0–20% $SrO$, and 0–20% $BaO$, 25–55% $P_2O_5$, with 0.3–3% by weight F, as analyzed in the final glass. Optional constituents therefor include up to 20% $PbO$, up to 7% $La_2O_3$, and up to 12% $ZnO$. The essential absence of $Al_2O_3$ is stated to be much preferred. Where the $P_2O_5$ content is less than 30%, $B_2O_3$ may be incorporated in amounts up to 25%. Where the content of $P_2O_5$ is at least 45%, $B_2O_3$ will be present at levels no greater than 5%. The sum of all optional ingredients other than RO and $R_2O$ will not exceed 25% and the total of all optional components exclusive of RO will be less than 35%.

It is explained in that application that vitreous, phosphate-based compositions containing fluoride are well known to the glass art but that such are commonly plagued by two seemingly intrinsic undesirable characteristics, viz., relatively poor chemical durability and a tendency to devitrify during forming and working. Many glasses also demonstrated poor resistance to weathering, i.e., they were attacked upon exposure to the ambient environment.

OBJECTIVE OF THE INVENTION

The principal objective of the invention is to provide essentially dry, alkali metal aluminofluorophosphate glasses, optionally containing substantial amounts of certain divalent metals, demonstrating a transition temperature below about 350° C. such that the glasses will exhibit a viscosity no greater than about $10^9$ poises at temperatures below about 400° C., and which manifest good chemical durability, resistance to weathering, and glass stability, i.e., resistance to devitrification during forming and working.

A practical objective of the invention is to design compositions of glasses especially suitable for use in optical and ophthalmic applications; specifically, compositions having the capability of being molded into aspheric lenses.

BRIEF DESCRIPTION OF THE DRAWING

The appended FIG. 1 is a schematic illustration of the molding behavior exhibited by the inventive glasses as characterized in terms of transition temperature and chemical durability demonstrated.

SUMMARY OF THE INVENTION

We have determined that the above objectives can be achieved with glass compositions satisfying the following four criteria:

(1) the glass must be capable of being produced and shaped employing melting and forming techniques conventional in the glass art, that is, the glass
  (a) will display a relatively high viscosity at the liquidus, and/or
  (b) will demonstrate a low crystallization rate at the liquidus and, hence, good glass stability, and, where glass of high optical quality is demanded,
  (c) will be compatible with platinum or other refractory material;

(2) the glass must have a transition temperature below 350° C. such that it can be molded at viscosities no greater than about $10^9$ poises at temperatures below 400° C.;

(3) the glass must manifest at least a "B" rating in a weathering test procedure described hereinafter comprising exposure for one week in a weathering cabinet operating at 50° C. and 98% relative humidity; and (4) the glass must exhibit a weight loss of less than 2 $mg/cm^2$ after an immersion of one hour in distilled water having a temperature of 95° C.

Glass compositions complying with those four criteria can be found within a restricted alkali metal ($R^1$) aluminofluorophosphate system wherein the operable compositions range, as analyzed on an atomic basis, between about $R^1AlP_{2.0}F_{2.0}O_6$ and $R^1_{3.75}AlP_{3.0}F_{4.0}O_9$, with the requirement that the following three combinations of those components be rigorously observed in the essential atomic ratios of:

F:Al > 2 but < 4 (preferred range 3 ± 0.5)
P:Al > 2 but < 3
$R^1$:P > 0.5 but < 1.25 (preferred range > 0.75 but < 1.1)

Those levels of the four constituents on an atomic basis convert to the following approximate values, expressed in terms of weight percent as analyzed on the oxide basis, of

| | |
|---|---|
| $R_2^1O$ | 13–38 |
| $Al_2O_3$ | 16–23 |
| $P_2O_5$ | 46–64 |
| F | 17–23 |

Various divalent metal ($R^2$) glass modifiers such as lead, zinc, cadmium, and the alkaline earth metals may optionally be included in the composition. Where substantial quantities of those metals, i.e., at least 5% by weight total, are incorporated into the glass compositions, the operable ranges, as analyzed on an atomic range, vary between about $R^1_{0.75}R^2_{0.25}AlPF_2O_4$ and $R^1_{1.25}R^2_{2.5}AlP_{5.5}F_5O_{16}$, wherein $R^1$ designates an alkali metal and $R^2$ designates a divalent metal preferably selected from the group of lead, zinc, cadmium, and the alkaline earth metal, which, expressed in terms of weight percent on the oxide basis, converts to about

| | |
|---|---|
| $R_2^1O$ | 4–20 |
| $Al_2O_3$ | 4–20 |
| PbO and/or ZnO | 0–30 |
| CaO and/or SrO and/or BaO and/or CdO | 0–30 |
| MgO | 0–15 |
| PbO and/or ZnO + (MgO and/or CaO and/or SrO and/or BaO and/or CdO) | 5–50 |
| $P_2O_5$ | 30–50 |

-continued

| | |
|---|---|
| F | 4–15 | and wherein said compositions conform, on an atomic basis, to about

| | |
|---|---|
| F:Al | >2 but <5 |
| P:Al | >1 but <5.5 |
| $R^1$:P | >0.25 but <1.25 |
| Pb:Al | <1.25 |
| Zn:Al | <1.25 |
| Mg and/or Ca and/or Sr and/or Ba and/or Cd:Al | <1.25 |
| Pb and/or Zn + (Mg and/or Ca and/or Sr and/or Ba and/or Cd):Al | >0.25 but <2.5 |
| $(R^1 + R^2)$:P | <1 |

The most preferred compositions conform on an atomic basis to

F:Al 3±0.5
$R^1$:P 0.75±0.25

As was disclosed in United States Application Ser. No. 82,150, supra, the inclusion of $Al_2O_3$ in the glasses cited therein increased the transition temperatures ($T_g$) thereof to such an extent that its absence was directed. However, we have now discovered that where the glass compositions contain substantial amounts of fluoride, i.e., greater than about 4% analyzed in the final glass, $Al_2O_3$ can be incorporated into the glass without raising the $T_g$ thereof excessively. This incorporation of $Al_2O_3$ performs three vital functions: first, it increases the solubility of fluoride in the glass system; second, it inhibits liquid immiscibility which gives rise to phase separation in the glass; and, third, it vastly improves the weathering resistance and chemical durability of the glass.

Fluorine is a necessary component of the inventive glasses since it fluxes the base phosphate glasses down to lower $T_g$ temperatures for easier moldability. The weathering resistance and chemical durability of the glasses sharply decrease, however, with increasing fluoride concentrations.

Accordingly, the present invention is based upon the use of a combination of $Al_2O_3$ and F to endow the glasses with low transition temperatures coupled with good weather resistance and chemical durability. Moreover, not only must $Al_2O_3$ and fluoride be present in the glass composition in significant amounts, but the atomic ratio F:Al is of critical importance in achieving the desired balance between $T_g$ and chemical resistance of the glass. For example, lower ratios of F:Al provide greater chemical resistances but are accompanied with higher transition temperatures. As the ratio of F:Al increases, the transition temperature and chemical resistance of the glass decrease such that, at a ratio of about 5, the resistance of the glass to chemical attack is quite poor.

Laboratory studies have indicated that constant F:Al ratios, in a particular family of glasses, represent isotherms of transition temperatures and isodurabilities. Such phenomena are not unknown in the glass art. One instance of such is the so-called mixed alkali effect, wherein alkali metal oxides can be manipulated in order to simultaneously reduce glass viscosity and increase the chemical durability thereof. Analogously, the effects of $Al_2O_3$ on increasing glass durability and transition temperature are well known, as is the knowledge that fluoride produces opposite effects. However, the combination of those two components in the proper quantities produces behavior similar to the mixed alkali effect.

When the atomic ratio F:Al of about 4 is exceeded, the durability of the glass appears to decrease rapidly. This circumstance is not understood. The solubility of fluoride into glass compositions free from $Al_2O_3$ is poor with the level of fluoride retained therein being conjectured as associated with modifying cations. It is theorized that the increased solubility of fluoride in $Al_2O_3$-containing glasses is due to the fact that, as the content of fluoride increases, aluminum can readily change from four fold to six fold coordination and behave as a modifying cation, thereby permitting an increased number of anions in the glass structure (two $F^-$ ions replacing one $O^{-2}$ ion).

The above-described phenomena are illustrated graphically in appended FIG. 1. Thus, FIG. 1 pictures schematically the general behavior of alkali metal-alkaline earth metal-aluminofluorophosphate glasses. When other components of the glass composition are maintained at a fixed level, the critical molding properties, viz., durability and rheology, are invariant along lines of constant F:Al ratio. High F:Al ratios impart low transition temperatures but poor durability, whereas low F:Al ratios give glasses of good durability but high transition temperatures. The shaded area represents the preferred molding ranges which is limited on the high F:Al ratio boundary by the minimum acceptable durability and on the low F:Al ratio boundary by the maximum acceptable molding temperature. The position and dimensions of the preferred molding range will depend upon the other components of the glass, but it will generally lie in the region where the F:Al ratio is about 3±0.5. The boundary at which a glass demonstrates a low rate of devitrification and, hence, satisfactory forming capabilities will occur at axial distances along each contour line, that distance depending upon the other components of the glass composition.

The atomic ratio of alkali metal ($R^1$) to phosphorus is also vital to the inventive compositions. Thus, sufficient alkali metal must be present to perform as a flux but, where the atomic ratio of alkali metal to phosphorus ($R^1$:P) exceeds about 1.25, the glass becomes unstable, i.e., the glass is subject to devitrification. Where optional divalent metals ($R^2$) are included to modify the glass properties, e.g., the alkaline earth metals, cadmium, lead and/or zinc, the atomic ratio of alkali metal+divalent metal to phosphorus $(R^1+R^2)$:P should not exceed about 1. Again, levels of $R^1+R^2$ resulting in atomic ratios $(R^1+R^2)$:P greater than about 1 lead to glasses quite readily prone to devitrification. Finally, excessive quantities of alkali metals can develop glasses of reduced chemical durability.

Minor amounts of compatible metal oxides such as $La_2O_3$, $WO_3$, $MoO_3$, and $Nd_2O_3$ may be included to modify the refractive index and other physical properties of the glass. The total of such additions, however, will not exceed about 10% by weight.

Laboratory experience has demonstrated that, for practical purposes, the inventive glasses can be categorized into two general groups, viz., glasses consisting essentially solely of compositions within the $R^1_2O$-$Al_2O_3$-F-$P_2O_5$ system and glasses wherein significant amounts, e.g., at least 5% total, of at least one such modifying oxide as an alkaline earth metal oxide, PbO, ZnO, and CdO are included in the compositions.

Glasses within the simple quaternary exhibit refractive indices typically between about 1.45-1.5 and the optimum combination of good chemical durability, low $T_g$, and good glass stability is found with $Al_2O_3$ and F contents of about 16-23% and 17-23%, respectively. In contrast, where substantial amounts of an alkaline earth metal oxide, PbO, ZnO, and/or CdO are incorporated into the compositions, the optimum combination of properties is produced with $Al_2O_3$ contents of about 4-20% and F contents of about 4-15%, and the refractive indices of the glasses commonly range between about 1.5-1.7.

Prior Art

A study of the prior art is hampered by the fact that the workers generally reported glass compositions merely in terms of batch materials. As was observed in Application Ser. No. 82,150, supra, and as will be demonstrated hereinafter, volatilization of fluoride during melting can be as high as 90%. Accordingly, unless a chemical analysis of a glass is provided, the fluoride content retained therein is simply conjectured. The instant invention is grounded in the discovery that the inclusion of at least 4% by weight $Al_2O_3$ in alkali metal phosphate base glass compositions enables fluoride retentions up to 50% of that batched, while concurrently yielding products of relatively good chemical durability. Thus, fluoride contents approaching 24% by weight have been analyzed in such glasses. Because $Al_2O_3$ raises the transition temperature of the glasses, the fluoride content must be present at a level of at least 4% by weight in order to insure transition temperatures below 350° C.

U.S. Pat. No. 2,430,539 circumscribes an area of titanium fluophosphate glasses statedly useful in optical applications. $TiO_2$ was included in the compositions to improve chemical durability. The glasses were expressed by the formula $AF-TiO_2-M(PO_y)_z$, wherein AF represented an alkali metal fluoride, and $M(PO_y)_z$ designated a phosphate of aluminum or beryllium, commonly a meta- or orthophosphate. No analyses of the glasses are provided. The working examples indicated 55.5-77 mole percent NaF or KF, up to 19.8 mole percent $TiO_2$, 15-25 mole percent $Al(PO_3)_3$ or 40-44.5 mole percent $AlPO_4$. There is no mention of PbO, CdO, an alkaline earth metal oxide, or ZnO.

U.S. Pat. No. 2,496,824 delineates iron fluophosphate glasses which, because of the low coloration observed therein, were asserted to be suitable for optical applications. The compositions, in weight percent as calculated from the batches, consisted essentially of 20-40% NaF, 22-40% LiF, 2-15% $Fe_2O_3$, and 55-76% $Al(PO_3)_3$. No analyses of the glasses are provided, PbO, CdO, an alkaline earth metal oxide, and/or ZnO are not required components, and the total alkali metal content is far in excess of that which can be tolerated in the present invention.

U.S. Pat. No. 2,481,700 discloses fluophosphate glasses purportedly operable in optical applications which are encompassed within the formula $AF-MF_2-R$, wherein AF designates a fluoride selected from the group of LiF, NaF, and KF, $MF_2$ represents a fluoride selected from the group of $MgF_2$, $CaF_2$, $SrF_2$, $BaF_2$, and $ZnF_2$, and R indicates an aluminum and/or beryllium phosphate. AF constitutes 7-54% by weight of the composition, $MF_2$ 0-58% by weight, and R makes up 30-90% by weight, the atomic proportion of fluorine to phosphorus in the glass batch being between 0.23-2.9. No analyses of the glasses are provided, CdO, an alkaline earth metal oxide, PbO and/or ZnO are not required constituents, and there is no teaching regarding the need for maintaining a particular ratio between the aluminum and fluoride components. With respect to this latter circumstance, it must be noted that $Al_2O_3$ was merely an optional ingredient. Moreover, there is no indication that the atomic ratio $R^1$:P must be less than 1.25 or that the atomic ratio $(R^1+R^2)$:P must be less than 1. Finally, none of the working examples is included in the effective ranges of the present inventive compositions.

U.S. Pat. No. 2,511,227 relates to lead-containing, sodium or barium aluminofluorophosphate glasses. As calculated from the batch, the glasses consist essentially, in mole percent, of 50-70% NaF or 25-50% $BaF_2$, 25-70% $NaF+BaF_2$, 20-50% $PbF_2$ or 10-30% PbO, 10-50% $PbF_2+PbO$, and 15-40% $Al(PO_3)_3$. No analyses of the final glasses are provided, lead is a required component and alkali metal is an optional constituent, those factors being the converse of the instant compositions, and there is no teaching of the need to maintain the atomic ratio F:Al between 2-5 and the atomic ratio $(R^1+R^2)$:P less than 1. The two working examples reported having compositions within the sodium aluminofluorophosphate field exhibit atomic ratios $(R^1+R^2)$:P in excess of 1.

U.S. Pat. No. 3,281,254 describes glasses stated to be useful for optical applications having batch compositions, expressed in weight percent, of about 16-23.8% alkali metal metaphosphate, 23.8-41% alkaline earth metal metaphosphate, and 1-21% of a fluoride selected from the group of $PbF_2$, LiF, $KHF_2$, $ZnSiF_2$, $BaF_2$, and $MgF_2$. Yet again, no analyses indicating the fluoride content in the final glass are provided nor is there even a suggestion of a need to maintain a particular ratio between the aluminum and fluoride components and between the $R^1+R^2$ and phosphorus components. Finally, none of the working examples falls within the operable ranges of the present inventive compositions.

U.S. Pat. No. 3,656,976 discloses fluophosphate glasses reportedly suitable for optical purposes consisting essentially, as calculated from the batch in cationic percent, of 15-40% $PO_{2.5}$, 0.5-21% $BO_{1.5}$, the ratio B:P being less than 0.7, 0.7-40% alkali metal fluoride, 10-60% alkaline earth metal fluoride, and 10-25% $AlF_3$. No fluoride analyses of the final glass are provided, $B_2O_3$ is a required rather than an optional ingredient, and there is no requirement that a specific ratio be maintained between the fluoride and aluminum components, the phosphorus and aluminum components, the alkaline metal and aluminum components, and the $R^1+R^2$ and phosphorus components. Furthermore, the present inventors have observed that melting batches containing both fluoride and $B_2O_3$ results in the increased rate of volatilization of both components due to the formation of $BF_3$.

U.S. Pat. No. 3,954,484 discusses alkaline earth aluminofluorophosphate glasses having indices of refraction greater than 1.57, an Abbe number less than 70, and a relatively high positive anomalous partial dispersion. No analyses of fluoride present in the final glass are reported, alkali metal oxides are implicitly absent from the compositions, and there is no requirement that a critical atomic ratio be maintained between the fluoride and aluminum contents, the phosphorus and aluminum components, and the $R^1+R^2$ and phosphorus constituents.

U.S. Pat. No. 4,142,986 describes neodymium- and beryllium-containing, alkali metal aluminofluorophosphate glasses useful in laser applications. The inclusion of beryllium in substantial amounts (48.7–60.1% $BeF_2$) places the glasses outside of the present inventive compositions. However, the patent provides one comparative example where beryllium was absent. That example, standing alone, cannot provide a teaching of the need to maintain the atomic ratios F:Al, P:Al, $R^1$:Al, $R^2$:Al, and $(R^1+R^2)$:P within certain specified values. As a matter of fact, the F:Al ratio of that composition is about 6, which is greater than the maximum of 5 permitted in the present inventive compositions.

*Laser Program Annual Report*—1975, Lawrence Livermore Laboratory, March, 1976, pp. 197–202, compares several families of glasses with regard to their utility for laser applications. Although glasses containing high levels of beryllium were deemed to be the most desirable, the article noted that alkali metal aluminofluorophosphates (containing neodymium) were the next most desirable glasses and supplied two specific examples of such glasses. Nevertheless, there was no disclosure in the publication pointing out the criticality of maintaining atomic ratios of F:Al, P:Al, $R^1$:P, $R^2$:Al, and $(R^1+R^2)$:P, within designated limits and the examples reported therein are outside of the atomic ratios required in the present inventive compositions.

In summary, none of the above references teaches alkali metal aluminofluorphosphate glasses with or without the addition of divalent metals wherein, not only must the base compositions thereof be maintained within defined ranges of components, but also those components must be held to certain specified ratios between each other. Hence, in short, there is no appreciation of the crux of the present invention, viz., the necessary relationship which must be observed to produce dry glasses capable of being molded into such complex configurations as aspheric lenses at low temperatures while yet evidencing practical chemical durability and weathering resistance.

Description of the Preferred Embodiments

Table I records a number of exemplary glass batches melted on a laboratory scale, reported in terms of parts by weight of the actual batch ingredients utilized, illustrating the parameters of the instant invention. Reagent grade batch materials were employed in these laboratory melts to forestall any anomalous reaction or phenomenon due to impurities in the starting materials. Particularly desirable phosphate compounds for batch materials included the alkali metal and alkaline earth metal meta- and orthophosphates. $Al(PO_3)_3$, $Pb(PO_3)_2$, and $Zn_3(PO_4)_2$ were also found to be helpful in achieving good glass quality. $P_2O_5$ can be utilized as a batch ingredient although it is hygroscopic, it cannot be ballmilled with any ease, and it volatilizes rapidly during the initial stages of melting. Ammonium phosphate was considered to be an unacceptable batch material because, whereas it can be ballmilled, it volatilizes very readily during the early stages of melting. Furthermore, it is a reducing agent and, as such, is compatible with such easily-reducible metal oxides as PbO. It will be apparent that the compounds recited in Table I are illustrative only and that other materials can be substituted therefor.

The batch ingredients were compounded, tumble mixed together to assist in obtaining a homogeneous melt, and then charged into 96% silica or alumina crucibles. Although the batches recorded in Table I represent laboratory scale melts only, it must be appreciated that larger melts thereof can be made in pots or commercial continuous melting tanks. The crucibles were introduced into a furnace operating at about 900° C. and the batches melted for about one-half hour. The melts were thereafter poured into a steel mold to produce a glass slab which was immediately transferred to an annealer operating at about 25° C. above the Tg of the glass.

TABLE I

| | 1 | 2 | 3 | 4 | 5 | 6 | 7 | 8 |
|---|---|---|---|---|---|---|---|---|
| $NaPO_3$ | 71 | 35 | — | — | — | — | — | — |
| $LiPO_3$ | 61 | 61 | 61 | 61 | 61 | 31 | — | — |
| $Pb(PO_3)_2$ | 188 | 188 | 188 | 94 | — | — | — | — |
| $P_2O_5$ | 74 | 99 | 124 | 161 | 198 | 223 | 245 | 199 |
| $BaF_2$ | 115 | 115 | 115 | 115 | 115 | 116 | 115 | 58 |
| $AlF_3.H_2O$ | 46 | 46 | 46 | 46 | 46 | 46 | 46 | 46 |
| NaF | — | 15 | 30 | 30 | 30 | 30 | 30 | 30 |
| $PbF_2$ | — | — | — | 63 | 126 | 126 | 126 | 126 |
| LiF | — | — | — | — | — | 9 | 18 | 18 |
| $Ba(PO_3)_2$ | — | — | — | — | — | — | — | 97 |

| | 9 | 10 | 11 | 12 | 13 | 14 | 15 | 16 |
|---|---|---|---|---|---|---|---|---|
| $NaPO_3$ | — | — | 42 | — | — | — | — | — |
| $LiPO_3$ | — | — | 73 | 73 | 73 | 37 | — | 31 |
| $Pb(PO_3)_2$ | — | — | 226 | 226 | — | — | — | — |
| $P_2O_5$ | 245 | 239 | 119 | 149 | 238 | 268 | 294 | 223 |
| $BaF_2$ | — | 70 | 138 | 138 | 138 | 138 | — | 115 |
| $AlF_3.H_2O$ | 46 | 55 | 55 | 55 | 55 | 55 | 55 | 46 |
| NaF | 30 | 36 | 18 | 36 | 36 | 36 | 36 | 30 |
| $PbF_2$ | 126 | 151 | — | — | 151 | 151 | 151 | 126 |
| LiF | 18 | 22 | — | — | — | 11 | 22 | 9 |
| $Ba(PO_3)_2$ | 194 | 116 | — | — | — | — | 116 | — |

| | 17 | 18 | 19 | 20 | 21 | 22 |
|---|---|---|---|---|---|---|
| $Al(PO_3)_3$ | 44.7 | 44.7 | 44.9 | 41.2 | 41.4 | 41.9 |
| $LiPF_6$ | — | 8.2 | 7.3 | 27.7 | 36.6 | 42.4 |
| $KPF_6$ | 29.0 | 37.9 | 25.0 | — | 11.3 | — |
| $NaPF_6$ | 26.3 | 9.2 | 22.8 | 30.8 | 10.7 | 15.6 |

Table IA reports the compositions of Table I in terms of weight percent on the oxide basis as calculated from the batch. Because it is not known with which cation(s) the fluoride is combined, it is simply tabulated as F in excess of the oxide components, the sum of the latter being normalized to 100%.

TABLE IA

| | 1 | 2 | 3 | 4 | 5 | 6 | 7 | 8 |
|---|---|---|---|---|---|---|---|---|
| $Na_2O$ | 4.2 | 4.2 | 4.2 | 4.2 | 4.2 | 4.2 | 4.2 | 4.2 |
| $Li_2O$ | 2.0 | 2.0 | 2.0 | 2.0 | 2.0 | 2.0 | 2.0 | 2.0 |
| $P_2O_5$ | 47.5 | 47.5 | 47.5 | 47.5 | 47.5 | 47.5 | 47.5 | 47.5 |
| BaO | 19.5 | 19.5 | 19.5 | 19.5 | 19.5 | 19.5 | 19.5 | 19.5 |
| $Al_2O_3$ | 4.5 | 4.5 | 4.5 | 4.5 | 4.5 | 4.5 | 4.5 | 4.5 |
| PbO | 22.3 | 22.3 | 22.3 | 22.3 | 22.3 | 22.3 | 22.3 | 22.3 |
| F | 9.46 | 10.6 | 11.7 | 13.3 | 14.9 | 15.9 | 17.1 | 15.0 |

| | 9 | 10 | 11 | 12 | 13 | 14 | 15 | 16 |
|---|---|---|---|---|---|---|---|---|
| $Na_2O$ | 3.7 | 4.3 | 4.2 | 4.2 | 4.2 | 4.4 | 3.7 | 4.3 |
| $Li_2O$ | 1.7 | 2.0 | 2.0 | 2.0 | 2.0 | 2.1 | 1.7 | 2.1 |
| $P_2O_5$ | 55.1 | 47.3 | 47.6 | 47.6 | 47.6 | 45.6 | 55.2 | 46.6 |
| BaO | 16.7 | 19.6 | 19.6 | 19.6 | 19.6 | 20.6 | 16.7 | 19.6 |
| $Al_2O_3$ | 3.8 | 4.5 | 4.5 | 4.5 | 4.5 | 4.6 | 3.8 | 4.9 |
| PbO | 19.0 | 22.2 | 22.2 | 22.2 | 22.2 | 22.9 | 18.9 | 22.5 |
| F | 11.3 | 15.04 | 10.6 | 11.7 | 14.85 | 15.9 | 11.25 | 16.0 |

| | 17 | 18 | 19 | 20 | 21 | 22 |
|---|---|---|---|---|---|---|
| $Na_2O$ | 6.1 | 2.2 | 5.3 | 7.6 | 2.6 | 3.8 |
| $Li_2O$ | — | 1.0 | 0.9 | 3.6 | 4.8 | 5.6 |
| $P_2O_5$ | 73.9 | 74.6 | 74.9 | 78.5 | 78.5 | 80.0 |
| $Al_2O_3$ | 10.7 | 10.8 | 10.8 | 10.3 | 10.3 | 10.6 |
| $K_2O$ | 9.3 | 12.4 | 8.1 | — | 3.8 | — |
| F | 36.0 | 36.0 | 36.0 | 41.0 | 41.0 | 41.0 |

The glasses of Table I were chemically analyzed for fluoride and alumina employing techniques customary in the glass art. Those values are recorded in Table II and, in the case of F, a comparison is drawn (% retention) between the amount of fluoride in the batch materials in weight percent and the level thereof as analyzed in the final glass. The atomic ratio F:Al on the analyzed basis is also tabulated, as is the atomic ratio $(R^1+R^2):P$ as calculated from the batch. Also, various physical properties are recorded as measured in accordance with conventional methods. Thus, refractive index ($n_D$) was determined by the Becke line technique, transition temperature was derived from differential scanning calorimetry, and density (g/cm$^3$) was measured utilizing a modification of the Westphal balance. Two very accelerated laboratory tests for estimating the chemical durability of the glasses were undertaken. The first involved an immersion of 10 minutes into an aqueous 10% by weight HCl solution at room temperature and the second an immersion of one hour in boiling water. The loss of weight manifested by the glasses is reported in terms of mg/cm$^2$. A loss in excess of 2 mg/cm$^2$ is deemed to designate unsatisfactory durability. N.C. means essentially no change observed. These tests are useful as a preliminary screening mechanism for chemical durability.

TABLE II

| | 1 | 2 | 3 | 4 | 5 | 6 | 7 | 8 |
|---|---|---|---|---|---|---|---|---|
| F Batched | 9.46 | 10.6 | 11.7 | 13.3 | 14.85 | 15.9 | 17.07 | 15.04 |
| F Analyzed | 3.77 | 3.91 | 4.94 | 5.4 | 5.36 | 4.93 | 5.64 | 5.32 |
| % F Retention | 39.95 | 36.88 | 42.2 | 40.6 | 36.1 | 31.00 | 33.1 | 35.37 |
| Al$_2$O$_3$ Analyzed | 5.77 | 5.84 | 5.90 | 6.08 | 5.34 | 5.97 | 6.44 | 6.39 |
| F:Al | 1.74 | 1.79 | 2.24 | 2.45 | 2.69 | 2.21 | 2.34 | 2.23 |
| $(R^1+R^2):P$ | 0.73 | 0.73 | 0.73 | 0.73 | 0.73 | 0.73 | 0.73 | 0.73 |
| Density | 3.673 | 3.653 | 3.660 | 3.725 | 3.556 | 3.750 | 3.804 | 3.768 |
| T$_g$ | 335° C. | 330° C. | 325° C. | 320° C. | 300° C. | 330° C. | 330° C. | 335° C. |
| Boiling H$_2$O | N.C. | N.C. | N.C. | N.C. | N.C. | N.C. | N.C. | N.C. |
| 10% HCl | 1.13 | 1.01 | 1.62 | 1.92 | 2.75 | 1.67 | 2.25 | 1.78 |
| n$_D$ | 1.602 | 1.596 | 1.594 | 1.580 | 1.604 | 1.604 | 1.604 | 1.604 |

| | 9 | 10 | 11 | 12 | 13 | 14 | 15 | 16 |
|---|---|---|---|---|---|---|---|---|
| F Batched | 11.25 | 15.04 | 10.6 | 11.7 | 14.85 | 15.9 | 11.25 | 15.9 |
| F Analyzed | 2.11 | 1.37 | 6.62 | 7.14 | 7.83 | 8.07 | 4.33 | 4.8 |
| % F Retention | 18.75 | 9.11 | 62.45 | 61.02 | 52.72 | 50.75 | 38.48 | 30.2 |
| Al$_2$O$_3$ Analyzed | 5.27 | 4.10 | 6.16 | 6.75 | 7.10 | 7.25 | 6.18 | 5.6 |
| F:Al | 1.07 | 0.895 | 2.88 | 2.83 | 2.95 | 2.98 | 1.88 | 2.33 |
| $(R^1+R^2):P$ | — | — | — | — | — | — | — | 0.94 |
| Density | 3.379 | 3.307 | 3.635 | 3.682 | 3.744 | 3.760 | 3.572 | 3.7502 |
| T$_g$ | 365° C. | 355° C. | 300° C. | 310° C. | 315° C. | 318° C. | 330° C. | 330° C. |
| Boiling H$_2$O | N.C. | N.C. | 0.0099 | 0.0247 | 0.0127 | 0.0193 | N.C. | N.C. |
| 10% HCl | 0.83 | 0.32 | 1.67 | 1.48 | 1.84 | 1.82 | 0.38 | 1.67 |
| n$_D$ | 1.586 | 1.578 | 1.580 | 1.586 | 1.586 | 1.588 | 1.592 | 1.604 |

| | 17 | 18 | 19 | 20 | 21 | 22 |
|---|---|---|---|---|---|---|
| F Batched | 36.0 | 36.0 | 36.0 | 41.0 | 41.0 | 41.0 |
| F Analyzed | 18.1 | 18.4 | 18.7 | 20.4 | 19.5 | 20.8 |
| % F Retention | 50.3 | 51.1 | 51.9 | 49.8 | 47.6 | 50.7 |
| Al$_2$O$_3$ Analyzed | 16.8 | 16.8 | 17.4 | 18.5 | 19.5 | 18.3 |
| F:Al | 2.9 | 2.9 | 2.9 | 3.0 | 2.9 | 2.5 |
| Density | — | 2.616 | 2.656 | 2.613 | 2.645 | — |
| T$_g$ | 290° C. | 300° C. | 290° C. | 290° C. | 283° C. | 313° C. |
| Boiling H$_2$O | 0.001 | 0.0005 | 0.0005 | 0.0004 | 0.0018 | 0.0017 |
| 10% HCl | 0.35 | 0.24 | 0.07 | 0.44 | 1.52 | 0.34 |
| n$_D$ | 1.452 | — | — | 1.464 | — | — |

In general, the batches melted in Al$_2$O$_3$ crucibles retained more fluoride in the final glass than those melted in 96% SiO$_2$ crucibles. It is conjectured that the molten batch reacts with the SiO$_2$ of the crucible to form the highly volatile SiF$_4$. The batches melted in Al$_2$O$_3$ crucibles picked up about 1–2% Al$_2$O$_3$ therefrom when the amount of batched Al$_2$O$_3$ is compared with the analyzed value therefor. An unexpected effect upon fluoride retention was found in batches melted in uncovered crucibles, viz., those glasses melted in uncovered crucibles showed a higher retention of fluoride than those melted in covered crucibles. It is theorized that covering the crucibles causes more water to be retained in the melt which, in turn, leads to the forming of the highly volatile HF. However, P$_2$O$_5$ and other relatively more volatile compounds are lost more readily from the molten glass when melted in open crucibles. The fluoride retention levels listed in Table II were calculated from a comparison of the analyzed fluoride concentrations with the batch values. That calculation is not fully accurate, however, since it does not take into account other volatile products. Total accuracy would require complete chemical analyses of all exemplary compositions. A comparison of the batched $Al_2O_3$ values with the analyzed values indicates that volatilization thereof during melting is essentially negligible.

Melting the glasses in alumina crucibles with all or virtually all of the $P_2O_5$ batched from $P_2O_5$ anhydride and alkali metal metaphosphates is recommended inasmuch as the batches melt down rapidly and exhibit high fluoride retentions. The use of lead and barium metaphosphates as batch materials causes slow melting with considerable foaming.

As can be seen via a study of Table II, the atomic ratio F:Al dictates the transition temperature exhibited by a glass. Hence, generally, the lower the ratio, the higher the transition temperature. The concentration of fluoride in the glass is also of vital importance in this regard. Thus, Examples 9 and 10 of Table I, containing 2.11% and 1.37% fluoride, respectively, as chemically analyzed, demonstrate $T_g$ values in excess of 350° C.

Table III records full analyses for Examples 16–22 as recited in weight percent on the oxide basis. For convenience in study, the fluorine correction factor has been ignored, fluoride has simply been reported as such, and the total of the other components, being listed in terms of oxides, has been normalized to 100. Accordingly, fluoride is tabulated as being present in excess of the base glass oxide constituents. In like manner, Table IIIA records those analyses as expressed in terms of atom ratios, the fluorine again being reported as being present in excess of the metallic components.

TABLE III

|  | 16 | 17 | 18 | 19 | 20 | 21 | 22 |
|---|---|---|---|---|---|---|---|
| $P_2O_5$ | 41.5 | 54.0 | 54.0 | 55.0 | 56.0 | 57.0 | 60.0 |
| $Al_2O_3$ | 5.6 | 18.0 | 18.0 | 19.0 | 20.0 | 21.0 | 22.0 |
| $K_2O$ | — | 16.0 | 21.0 | 15.0 | — | 7.0 | — |
| $Na_2O$ | 4.9 | 11.0 | 4.0 | 9.0 | 15.0 | 15.0 | 6.0 |
| $Li_2O$ | 2.1 | — | 2.0 | 2.0 | 7.0 | 10.0 | 1.2 |
| F | 4.8 | 18.1 | 18.4 | 18.7 | 20.4 | 19.5 | 20.8 |
| BaO | 20.6 | — | — | — | — | — | — |
| PbO | 25.4 | — | — | — | — | — | — |

TABLE IIIA

|  | 16 | 17 | 18 | 19 | 20 | 21 | 22 |
|---|---|---|---|---|---|---|---|
| P | 47 | 42 | 42 | 41 | 36 | 37 | 37 |
| Al | 9 | 20 | 20 | 20 | 18 | 19 | 18 |
| K | — | 19 | 25 | 17 | — | 7 | — |
| Na | 13 | 19 | 7 | 15 | 23 | 7 | 9 |
| Li | 11 | — | 7 | 6 | 23 | 30 | 34 |
| F | 21 | 56 | 58 | 58 | 55 | 53 | 53 |
| Ba | 11 | — | — | — | — | — | — |
| Pb | 9 | — | — | — | — | — | — |
| F:Al | 2.33 | 2.8 | 2.9 | 2.9 | 3.1 | 2.8 | 2.9 |
| $R^1$:P | 0.5 | 0.9 | 0.9 | 0.95 | 1.3 | 1.0 | 1.2 |
| $(R^1 + R^2)$:P | 0.94 | — | — | — | — | — | — |

As can be observed from a comparison of Table IA and III, volatilization of the alkali metals and alkaline earth metals is relatively negligible. Depending upon the batch materials employed, loss of $P_2O_5$ can range from very low to as much as 25%. Likewise, the loss of fluoride is a function of the batch materials, as well as the melting practices utilized, and can vary from about 20–60%.

Table IV reports the results of parallel plate viscosity measurements conducted over the range of $10^5$–$10^{10}$ poises on five glasses. The difference between the softening point ($T_{sp}$) and the transition range, the analyzed weight percent $Al_2O_3$, the analyzed weight percent F, and the atomic ratio F:Al are provided for each glass.

TABLE IV

| Glass | $T_{sp}$-$T_g$ | % $Al_2O_3$ | % F | F:Al |
|---|---|---|---|---|
| A | 85 | 5.34 | 5.36 | 2.69 |
| B | 98 | 5.97 | 4.93 | 2.21 |
| C | 84 | 2.34 | 1.6 | 1.83 |
| D | 90 | 5.77 | 3.77 | 1.74 |
| E | 88 | 5.27 | 2.11 | 1.07 |

A large difference in temperature between the softening point and transition temperature indicates a shallow viscosity curve whereas a small difference in temperature means a steep curve. The steepness of the curve in this viscosity range does not appear to be directly related to the fluoride concentration or to the atomic F/Al ratio. Nevertheless, it seems to follow the $Al_2O_3$ level, i.e., the lower the $Al_2O_3$ value, the steeper the curve. It is postulated that this circumstance is due to the capability of the $Al^{+3}$ cation to tie up one alkali metal cation, thereby stiffening the glass in this region of viscoelastic flow.

The transition temperature of a glass has been generally defined as the temperature at which a molten mass becomes an amorphous solid, that temperature typically being deemed to lie in the vicinity of the annealing point of a glass. The annealing point of a glass has customarily been recognized as the temperature at which a glass exhibits a viscosity of $10^{13}$ poises and the softening point of a glass as that temperature corresponding to a viscosity of $10^{7.6}$ poises. Molding of the inventive glasses into shaped articles and, particularly, articles of such complex shapes as aspheric lenses will desirably be undertaken at temperatures where the glasses demonstrate a viscosity of about $10^9$ poises. Such temperatures will normally range about 50° C. above the transition temperature of the glass.

A study was undertaken to evaluate the effect of divalent cations upon the properties of the inventive fluorphosphate glasses. Compositions involving three ranges of F:Al ratios were selected, viz., Group A wherein F:Al is >1.5 but <2.5, Group B wherein F:Al is >2.5 but <4.2, and Group C wherein F:Al is >4.2. Utilizing BaO as the base, the effect of equimolar substitutions of other divalent metal cations was examined. The properties of immediate concern were $T_g$, chemical durability, refractive index, and fluoride retention. The cations chosen for the investigation were the alkaline earth metals Mg, Ca, and Sr, along with Cd, Pb, and Zn.

The majority of the melts was conducted in platinum crucibles equipped with tight fitting platinum covers. Porcelain, alumina, glassy carbon, and VYCOR ® brand crucibles were employed with the glasses containing lead and cadmium. Those crucibles were also covered but with VYCOR ® brand or porcelain lids.

Table V reports the three groups of exemplary glass batches in terms of parts by weight on the oxide basis as calculated from the batch. Because the sum of the ingredients totals or approximately totals 100, for all practical purposes the values recorded may be deemed to reflect weight percent. Since it is not known with which cation(s) the fluoride is combined, it is simply recited as the fluoride. Analyzed values of fluoride are also tabulated. With the exception of cadmium and zinc, which were batched as orthophosphates, the divalent cations were added as metaphosphates. (Table VA records the compositions as recalculated in terms of approximate mole percent on the oxide basis.)

The batch ingredients were compounded, tumble mixed together to aid in securing a homogeneous melt, and thereafter charged into crucibles, the type of crucible employed being reported in the Table. The crucibles were introduced into a furnace operating at 1000° C. and maintained therewithin for about 10 minutes. The melts were quenched into glass slabs by pouring onto graphite blocks and the slabs annealed by holding for two hours in a furnace operating at about 15°–40° C. above the $T_g$ of the glass and then allowed to cool at furnace rate.

The fluoride content in the glass was determined via conventional chemical analysis practice and the percent retention between the amount of fluoride in the batch materials and the level thereof as analyzed in the final glass is reported in Table V. Refractive index ($n_D$), as determined via the Becke line technique, and the transition temperature ($T_g$), as measured through differential scanning calorimetry in terms of °C., are also tabulated.

A weathering test was conducted in a humidity cabinet wherein the temperature and relative humidity were maintained constant at 50° C. and 98%, respectively. Small pieces were broken off the glass slabs and placed upon a nichrome wire screen. After a soak period of eight days in the humidity cabinet, the specimens were removed and visually graded as to surface change. The rankings ranged from no change, A, to severe attack, F. A rating less than B was considered to reflect undesirable and unsatisfactory resistance to weathering.

To more critically investigate the water durability of the glasses, the following laboratory test was devised. Sections were cut from the slabs and each side ground with 320 grit silicon carbide paper such that all surfaces were uniformly abraded. The sections were then weighed and the external dimensions thereof carefully measured. The specimens were placed upon nichrome wire screens, the screens introduced into individual beakers, 100 ml of deionized water at 75° C. added thereto, and the beakers inserted into a constant temperature water bath operating at 95° C. After about 15 minutes the contents of the beakers were brought to a constant temperature (~95° C.). The beakers were held within the bath for another hour, the specimens removed from the beakers, washed, and air dried overnight. After weighing, the samples were evaluated in terms of weight loss per unit surface area (mg/cm$^2$) and those results are listed in Table V. A weight loss in excess of 2 mg/cm$^2$ was deemed to indicate unsatisfactory chemical durability.

TABLE V

| | Group A | |
|---|---|---|
| | 23 | 24 |
| K$_2$O | 7.2 | 9.8 |
| Li$_2$O | 2.3 | 3.1 |
| Al$_2$O$_3$ | 6.9 | 9.3 |
| P$_2$O$_5$ | 43.8 | 58.9 |
| BaO | 25.5 | — |
| CaO | — | 11.6 |
| F | 20.2 | 12.6 |
| Crucible | Porcelain | Pt |
| F analyzed | 5.6 | 8.6 |
| % F retained | 27.7 | 68.3 |
| Weathering | B | A |
| mg/cm$^2$ | 0.186 | 0.259 |
| $n_D$ | 1.618 | 1.508 |
| $T_g$ | 350° C. | 339° C. |

| | Group B | | | |
|---|---|---|---|---|
| | 25 | 26 | 27 | 28 |
| K$_2$O | 9.1 | 10.3 | 7.5 | 8.5 |
| Li$_2$O | 2.7 | 3.1 | 2.2 | 2.6 |
| Al$_2$O$_3$ | 4.4 | 4.9 | 3.6 | 4.1 |
| P$_2$O$_5$ | 52.3 | 59.1 | 43.0 | 49.3 |
| SrO | 18.8 | — | — | — |
| MgO | — | 8.2 | — | — |
| PbO | — | — | 33.2 | — |
| CdO | — | — | — | 23.5 |
| F | 22.0 | 24.9 | 18.1 | 20.7 |
| Crucible | Pt | Pt | Porcelain | Pt |
| F analyzed | 8.5 | 12.7 | 3.2 | 8.8 |
| % F retained | 63.0 | 51.1 | 18.0 | 42.3 |
| Weathering | B | A | B | A |
| mg/cm$^2$ | 1.467 | 1.134 | 0.026 | 0.577 |
| $n_D$ | 1.488 | 1.486 | 1.624 | 1.528 |
| $T_g$ | 268 | 343 | 326 | 302 |

| | Group C | | | | | | | |
|---|---|---|---|---|---|---|---|---|
| | 29 | 30 | 31 | 32 | 33 | 34 | 35 | 36 |
| K$_2$O | 9.1 | 8.7 | 8.7 | 9.5 | 10.3 | 10.9 | 8.7 | 6.3 |
| Li$_2$O | 2.9 | 2.8 | 2.8 | 3.0 | 3.3 | 3.5 | 2.8 | 2.0 |
| Al$_2$O$_3$ | 4.4 | 4.2 | 4.2 | 4.6 | 5.0 | 5.2 | 4.2 | 3.0 |
| P$_2$O$_5$ | 55.0 | 52.3 | 52.5 | 57.2 | 62.5 | 65.6 | 52.5 | 38.0 |
| SrO | 21.0 | 24.0 | — | — | — | — | — | — |
| CdO | — | — | 23.7 | — | — | — | 23.7 | — |
| CaO | — | — | — | 16.9 | 9.2 | — | — | — |
| MgO | — | — | — | — | — | 4.6 | — | — |
| PbO | — | — | — | — | — | — | — | 44.9 |
| F | 14.7 | 14.0 | 14.1 | 15.3 | 15.3 | 16.1 | 16.8 | 10.2 |
| Crucible | Pt | Pt | Al$_2$O$_3$ | Pt | Pt | Pt | C | VYCOR |
| F analyzed | 6.4 | 8.8 | — | 8.8 | 5.9 | 5.3 | 6.8 | 3.1 |

TABLE V-continued

| % F retained | 43.5 | 63.0 | — | 57.5 | 38.3 | 33.0 | 40.4 | 30.4 |
|---|---|---|---|---|---|---|---|---|
| Weathering | B | B | A | A | B | B | A | B |
| mg/cm$^2$ | 0.410 | 1.467 | 0.323 | 0.588 | 1.019 | 0.580 | 1.611 | 0.094 |
| n$_D$ | 1.512 | 1.488 | 1.544 | 1.510 | 1.508 | 1.498 | 1.542 | 1.656 |
| T$_g$ | 321° C. | 268° C. | 329° C. | 330° C. | 333° C. | 344° C. | 319° C. | 292° C. |

TABLE VA

| Group A | | |
|---|---|---|
| | 23 | 24 |
| K$_2$O | 4.4 | 7.1 |
| Li$_2$O | 4.4 | 7.1 |
| Al$_2$O$_3$ | 3.8 | 6.2 |
| P$_2$O$_5$ | 17.5 | 28.3 |
| BaO | 9.5 | — |
| CaO | — | 6.1 |
| F | 60.4 | 45.2 |

| Group B | | | | |
|---|---|---|---|---|
| | 25 | 26 | 27 | 28 |
| K$_2$O | 5.0 | 5.0 | 5.0 | 4.9 |
| Li$_2$O | 4.7 | 4.7 | 4.6 | 4.7 |
| Al$_2$O$_3$ | 2.2 | 2.2 | 2.2 | 2.2 |
| P$_2$O$_5$ | 19.0 | 18.9 | 19.0 | 20.0 |
| SrO | 9.4 | — | — | — |
| MgO | — | 9.5 | — | — |
| PbO | — | — | 9.3 | — |
| CdO | — | — | — | 9.9 |
| F | 59.7 | 59.7 | 59.9 | 59.3 |

| Group C | | | | |
|---|---|---|---|---|
| | 29 | 30 | 31 | 32 |
| K$_2$O | 6.0 | 5.9 | 6.1 | 5.7 |
| Li$_2$O | 6.0 | 6.0 | 6.1 | 5.7 |
| Al$_2$O$_3$ | 2.7 | 2.6 | 2.7 | 2.6 |
| P$_2$O$_5$ | 24.1 | 23.5 | 24.3 | 22.9 |
| SrO | 12.7 | 14.8 | — | — |
| CaO | — | — | — | 17.2 |
| F | 48.5 | 47.2 | 48.7 | 45.9 |

| | 33 | 34 | 35 | 36 |
|---|---|---|---|---|
| K$_2$O | 6.5 | 6.8 | 5.6 | 5.7 |
| Li$_2$O | 6.6 | 6.9 | 5.5 | 5.7 |
| Al$_2$O$_3$ | 2.9 | 3.0 | 2.5 | 2.5 |
| P$_2$O$_5$ | 26.2 | 27.0 | 22.2 | 22.9 |
| CaO | 9.8 | — | — | — |
| MgO | — | 6.7 | — | — |
| CdO | — | — | 11.1 | — |
| PbO | — | — | — | 17.2 |
| F | 48.0 | 49.6 | 53.1 | 46.0 |

The Group A glasses, having the lowest batched F:Al ratio, typically exhibit higher fluorine retentions than the glasses of the other two groups. The Group A glasses also normally manifest the best durability but disadvantageously frequently demonstrate high transition temperatures. The Group B glasses customarily display the lowest fluorine retention and the lowest transition temperatures of the three series.

With respect to the effect exerted by the individual divalent cations upon fluorine retention, Table V illustrates that the alkaline earth metals foster greater retentions than do Cd, Zn, and Pb. Sr provides the highest retention followed by Ca, Ba, and Mg in that order. Of the other three divalent metal ions investigated, Cd appeared to cause the greatest fluorine retention with Pb exhibiting the least. Upon an increase in the batched F:Al ratio, the retention of fluorine decreases. Likewise, an increase in the molar content of the divalent metal cation effects an increase in the fluorine retention. Those batches melted in platinum crucibles seemingly retained more fluorine than where the melting was conducted in crucibles fashioned from other materials.

An examination of Table V illustrates that, generally speaking, as the concentration of the divalent metal is increased, the amount of fluorine retained in the glass also increases. There is some scatter in the durability data but there appears to be a higher weight loss in the middle of the ranges studied than at both extremes thereof.

As might be expected, the results of the weathering tests generally correspond with the water durability test, with the best performances being evident with the lower F:Al ratios. However, the MgO-containing glasses appeared to be less affected than those containing Pb.

Accordingly, to achieve practical durability and weathering resistance in the inventive glasses containing divalent metal ions, the F:Al ratio will be held to below 5 and, preferably, below 4.

In summary, whereas the chemical durability and weathering resistance of the inventive glasses do not approach that of soda-lime or borosilicate glasses, they are quite comparable to many optical glasses having transition temperatures greater than 600° C. Moreover, as observed in application Ser. No. 82,150, supra, antireflective coatings, such as MgF$_2$, are commonly applied to glasses designed for use in optical applications. Such coatings serve to protect the surface of the glass from ambient moisture.

Example 16 constitutes one of the most preferred compositions, combining excellent weathering resistance, chemical durability, and moldability.

We claim:

1. An essentially dry alkali metal (R$^1$) aluminofluorophosphate glass exhibiting a relatively high viscosity at the liquidus, a low crystallization rate at the liquidus, a transition temperature below 350° C., at least a "B" rating in a weathering test procedure comprising exposure for one week in an atmosphere of 98% relative humidity at 50° C., a weight loss of less than 2 mg/cm$^2$ after immersion for one hour in distilled water at a temperature of 95° C., and demonstrating a viscosity no greater than about 10$^9$ poises at temperatures below 400° C., thereby displaying the capability of being molded at temperatures below 400° C. into complex shapes, which consists essentially, as analyzed on an atomic basis, between about R$^1$AlP$_{2.0}$F$_{2.0}$O$_6$ and R$^1_{3.75}$AlP$_{3.0}$F$_{4.0}$O$_9$, and wherein said components are present in the following atomic ratios:

F:Al >2 but <4
P:Al >2 but <3
R$^1$:P >0.5 but <1.25

2. A glass according to claim 1 wherein the atomic ratio F:Al is 3±0.5 and the atomic ratio R$^1$:P is >0.75 but <1.1.

3. A glass according to claim 1 consisting essentially, as analyzed in weight percent on the oxide basis, of about

| R$_2^1$O | 13–38 |
|---|---|
| Al$_2$O$_3$ | 16–23 |
| P$_2$O$_5$ | 46–64 |

| | |
|---|---|
| F | 17-23 |

4. A glass according to claim 1 also containing up to 10% by weight total of $La_2O_3$ and/or $WO_3$ and/or $MoO_3$ and/or $Nd_2O_3$.

5. An essentially dry alkali metal ($R^1$) aluminofluorophosphate glass also containing at least one divalent metal oxide ($R^2$) selected from the group of PbO, ZnO, CdO, MgO, CaO, SrO, and BaO which exhibits a relatively high viscosity at the liquidus, a low crystallization rate at the liquidus, a transition temperature below 350° C., at least a "B" rating in a weathering test procedure comprising exposure for one week in an atmosphere of 98% relative humidity at 50° C., a weight loss of less than 2 mg/cm² after immersion for one hour in distilled water at a temperature of 95° C., and demonstrates a viscosity no greater than about $10^9$ poises at temperatures below 400° C., thereby displaying the capability of being molded at temperatures below 400° C. into complex shapes, which consists essentially, as analyzed on an atomic basis, between about $R^1_{0.75}R^2_{0.25}AlPF_2O_4$ and $R^1_{1.25}R^2_{2.5}AlP_{5.5}F_5O_{16}$, and wherein said components are present in the following atomic ratios:

| | |
|---|---|
| F:Al | >2 but <5 |
| P:Al | >1 but <5.5 |
| $R^1$:P | >0.25 but <1.25 |
| Pb:Al | <1.25 |
| Zn:Al | <1.25 |
| Mg and/or Ca and/or Sr and/or Ba and/or Cd:Al | <1.25 |
| Pb and/or Zn + (Mg and/or Ca and/or Sr and/or Ba and/or Cd):Al | >0.25 but <2.5 |
| ($R^1$ + $R^2$):P | <1 |

6. A glass according to claim 5 wherein the atomic ratio F:Al is 3±0.5 and the atomic ratio $R^1$:P is 0.75±0.25.

7. A glass according to claim 5 consisting essentially, as analyzed in weight percent on the oxide basis of about

| | |
|---|---|
| $R_2^1O$ | 4-20 |
| $Al_2O_3$ | 4-20 |
| PbO and/or ZnO | 0-30 |
| CaO and/or SrO and/or BaO and/or CdO | 0-30 |
| MgO | 0-15 |
| PbO and/or ZnO + (MgO and/or CaO and/or SrO and/or BaO and/or CdO) | 5-50 |
| $P_2O_5$ | 30-50 |
| F | 4-15 |

8. A glass according to claim 5 also containing up to 10% total of $La_2O_3$ and/or $WO_3$ and/or $MoO_3$ and/or $Nd_2O_3$.

* * * * *

UNITED STATES PATENT AND TRADEMARK OFFICE
CERTIFICATE OF CORRECTION

PATENT NO. : 4,362,819

DATED : December 7, 1982

INVENTOR(S) : Anthony R. Olszewski, Paul A. Tick and Leon M. Sanford, deceased, by Michele R. Sanford, Administratrix It is certified that error appears in the above-identified patent and that said Letters Patent are hereby corrected as shown below:

PATENT
---

Column 1, line 12, change "3,285,730" to --4,285,730--.

Column 2, line 43, change "$R_2^1 0$" to --$R^1_2 0$--.

Column 2, line 61, change "$R_2^1 0$" to --$R^1_2 0$--.

Column 16, line 66, change "$R_2^1 0$" to --$R^1_2 0$--.

Column 18, line 19, change "$R_2^1 0$" to --$R^1_2 0$--.

Signed and Sealed this

Nineteenth Day of April 1983

[SEAL]

Attest:

GERALD J. MOSSINGHOFF

Attesting Officer  Commissioner of Patents and Trademarks